United States Patent Office 3,409,602
Patented Nov. 5, 1968

3,409,602
NOVEL POLYFLUOROALKYL ACRYLATE MONOMERS, POLYMERS AND INTERMEDIATES
Louis G. Anello, Basking Ridge, and Richard F. Sweeney, Randolph Township, Morris County, N.J., assignors to Allied Chemical Corporation, New York, N.Y., a corporation of New York
No Drawing. Filed Oct. 24, 1965, Ser. No. 505,007
17 Claims. (Cl. 260—89.5)

This invention relates to novel polyfluoroalkoxy acrylate monomers, polymers thereof and to certain novel intermediate polyfluoro alcohols.

Polymers prepared from the monoesters of acrylic acid and its derivatives have been long recognized as thermoplastic materials whose utility is both wide and varied. For example, acrylic polymers have been successfully employed as aircraft components, internally illuminated commercial signs, vending machine parts, windows, dials, safety shields, motor-boat deck hatches, shoe heels, piano and organ keys, industrial housings, etc. In addition, acrylic polymers, particularly fluorine-containing acrylic polymers, are susceptible to vulcanization to yield tough, stable polymers suitable for use as gasket material and also as tenacious coating materials. Fluorine-containing acrylic polymers are also known to be useful to impart oleophobic and hydrophobic finishes to various materials, such as cotton cloth or wool fabric.

We have found a class of acrylic polymers which possess extremely good oleophobic and hydrophobic properties and which, in addition, exhibit particularly good stability and durability to wear, washings and dry cleanings when applied to porous materials, such as textiles and the like. The novel class of polymers of the invention contain recurring polyfluoroalkoxy acrylate ester units of the formula:

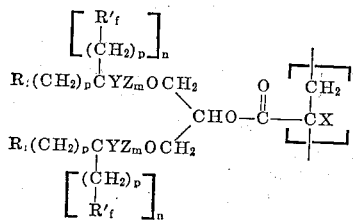

wherein X is H or $CH_3$; Y is H or F; Z is H or F; $R_f$ and $R'_f$ which may be the same or different, when taken singly, are prefluorinated alkyl groups preferably containing 2–11 carbon atoms inclusive and, when taken together, form a polyfluorinated cycloalkyl group possessing 4–6 carbon atoms inclusive; $n$ is 0 or 1; $m$ is 0 or 1, provided that when $n$ is 1, $m$ is 0 and when $n$ is 0, $m$ is 1 and provided that when $m$ is 1, Y and Z are alike; and wherein $p$ is 0–8.

The polymers of the invention, containing the recurring polyfluoroalkoxy acrylate ester units as above described, may be homopolymers, in which the indicated recurring units are the only ones present; copolymers, in which these recurring units are interspersed with units derived from another polymerizable unsaturated monomer; or heteropolymers, such as terpolymers, in which there are more than two distinct types of recurring units interspersed in the molecule. The homopolymeric products are thermoplastic and, depending on the molecular weight, vary from soft rubbery compositions to sticky, adhesive-like materials. These polymers are stable, flame resistant, not appreciably soluble in hydrocarbon solvents, such as benzene or xylene, but are soluble in certain fluorocarbons, such as trifluoroethyl trifluoroacetate. The homopolymeric products, or mixtures thereof, when used as fiber impregnators, impart good oleophobic and hydrophobic properties to such materials. The homopolymers also can be used to cast flexible, transparent, thermoplastic films, which can be used for wrapping and protective purposes. Co- and heteropolymeric products will reflect properties contributed by the co- or heteromonomer(s), but may be hard thermoplastic or thermosetting resins, useful as structural components for a variety of purposes for which prior art acrylic polymers have been employed, a number of which have been mentioned heretofore. Suitable polymerizable monomers for preparation of the co- and heteropolymers include the ethylenically unsaturated monomers well known to the art, such as the vinyl compounds, e.g., vinyl esters, vinyl halides, vinyl alkyl ketones, vinyl alkyl sulfones, some specific examples being vinyl isopropyl sulfone, cinylidene dichloride and N-vinyl urea; olefinic compounds, such as ethylene, propylene, isobutylene, butadiene and isoprene; aromatic compounds containing olefinic unsaturated groups, such as styrene and alpha-methyl styrene; other acrylic compounds including dissimilar fluorinated acrylic monomers in accordance with the description of this invention, other halogenated acrylates, acrylic acid amides, acrylic acid nitriles, etc., some specific examples being methyl acrylate, butyl methacrylate, 2-ethylhexyl acrylate, N,N-diethylaminoethyl methacrylate and glycidyl acrylate; other unsaturated acid esters, such as methyl crotonate, methyl maleate, diethyl fumarate, allyl acetate, allyl caprylate and a variety of other unsaturated compounds, such as unsaturated ketones, e.g., alkyl vinyl ketones and the like.

Modifiers, such as mercaptans, may be used to decrease the molecular weight of the polymeric products.

In the following and foregoing discussion of the invention, it is intended that the term "acrylic" (or acrylate) be understood to comprehend methyl-substituted acrylic (or acrylate), i.e., methacrylic (or methacrylate) as well as acrylic (or acrylate).

The novel polymers may readily be prepared by polymerizing our novel polyfluoroalkoxy acrylate monomers of the formula:

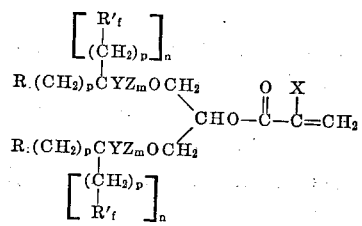

wherein X, Y, Z, $R_f$, $R'_f$, $m$, $n$ and $p$ are as defined above.

Preferred species within the generic invention, as defined above, are those compounds wherein $p$ is no greater than 2 and preferably 0; also wherein $n$ is 1; also wherein $R_f$ and $R'_f$ are straight chain perfluorinated alkyl groups and additionally wherein X is H.

In those embodiments wherein $R_f$ and $R'_f$ are straight chain perfluorinated alkyl groups, the preferred carbon content for such groups is between 6–10 carbon atoms, inclusive.

Illustrative polyfluoroalkoxy acrylate monomers within the scope of the invention include the following:

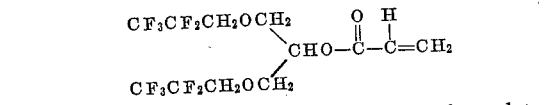

1,3-bis(1,1-dihydroperfluoropropoxy)isopropyl acrylate

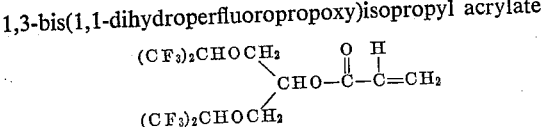

1,3-bis(hexafluoroisopropoxy)isopropyl acrylate

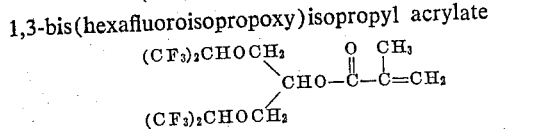

1,3-bis(hexafluoroisopropoxy)isopropyl methacrylate

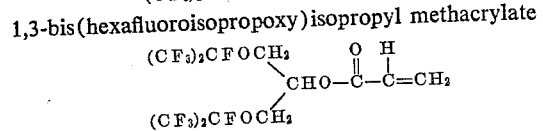

1,3-bis(heptafluoroisopropoxy)isopropyl acrylate

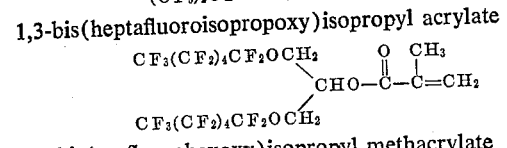

1,3-bis(perfluorohexoxy)isopropyl methacrylate

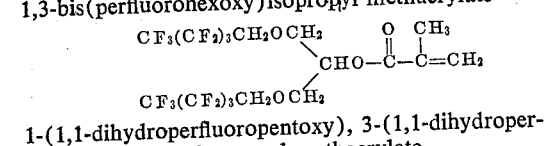

1-(1,1-dihydroperfluoropentoxy), 3-(1,1-dihydroperfluoroheptoxy)isopropyl methacrylate

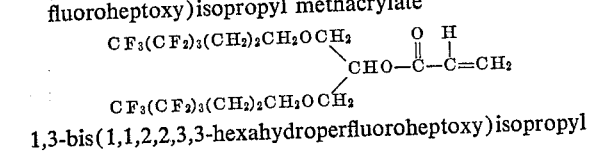

1,3-bis(1,1,2,2,3,3-hexahydroperfluoroheptoxy)isopropyl acrylate

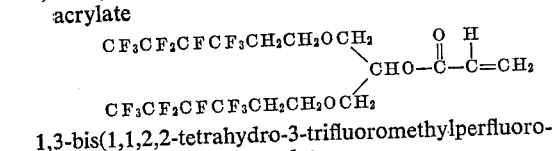

1,3-bis(1,1,2,2-tetrahydro-3-trifluoromethylperfluoropentoxy)isopropyl acrylate

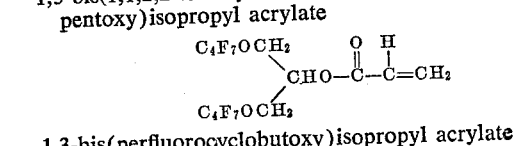

1,3-bis(perfluorocyclobutoxy)isopropyl acrylate

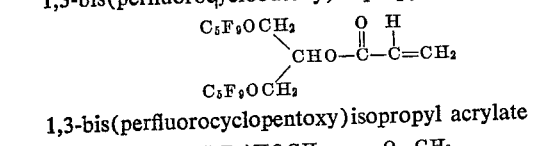

1,3-bis(perfluorocyclopentoxy)isopropyl acrylate

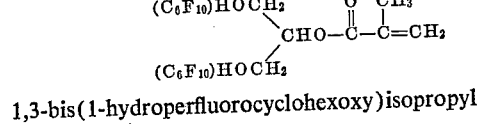

1,3-bis(1-hydroperfluorocyclohexoxy)isopropyl methacrylate.

THE POLYMERIZATION REACTION

The polymerization technique may be any of the conventional free radical polymerization techniques, such as bulk polymerization, emulsion polymerization and solution polymerization of the appropriate monomers, as defined above. Bulk polymerization may be carried out using some form of light or a peroxide as initiator. Solution polymerization can be carried out employing a suitable solvent, such as trifluoroethyl trifluoroacetate, and a catalyst, such as a peroxide as initiator.

The preferred method of polymerization is in aqueous emulsion. The polymer can be obtained as an emulsion but is normally obtained as a coagulated polymer or as a mixture of coagulated polymer and emulsion. Emulsification can be effected by the addition of any one of a number of conventional anionic, non-ionic or cationic emulsifiers, such as sodium lauryl sulfate, the K salt of perfluorosulfonic acid, trimethyltetradecylammonium chloride, sodium lauryl sulfosuccinate and the like. The emulsions may be easily used to apply thin films of the polymers to various surfaces by conventional methods including the procedure, for example, of coating, as by brushing, dipping of spraying and subsequent air-drying. If the polymer is not recovered in substantially emulsion form it should be further coagulated prior to use in forming films. This may be accomplished by addition of a coagulating agent, such as methanol or acetone, or by mechanical methods, such as freezing. The coagulum, after drying, must be dissolved or dispersed in a suitable solvent prior to use.

Suitable polymerization catalysts or initiators are illustrated by organic or inorganic free radical generators, such as benzoyl peroxide, lauryl peroxide, acetyl peroxide, succinyl peroxide, azobutyronitrile, potassium persulfate, hydrogen peroxide and sodium peroxide.

Polymerization may also be initiated by means of actinic radiation (light) and such is normally accomplished by placing the monomers in an evacuated sealed tube and then exposing the tube to a light source, preferably ultraviolet light, at temperatures ranging from about room temperature to about 125° C.

The reaction time for the polymerization varies over a wide range and for the most part is dependent both upon the temperature employed and upon the nature of the free radical initiator, or the intensity of the actinic radiation, whichever may be the case. Normally polymerization catalyzed by actinic radiation is accomplished in about 10–72 hours. When organic catalysts are employed, polymerization may be accomplished within a period of about 1–10 hours.

Polymerization can be recognized by observing the formation of a rubbery or hard, tacky material or by observing coagulation or formation of an emulsion out of solution.

Example 1

To a three-necked, 50 ml. flask, equipped with a dropping funnel, stirrer, thermometer and a reflux condenser were added 15 g. of deionized water, 0.09 g. of sodium lauryl sulfate and 0.014 g. of potassium persulfate. After flushing the flask contents with nitrogen, 2.5 g. of 1,3-bis(hexafluoroisopropoxy)isopropyl acrylate were added, with stirring, to the reaction mixture. The temperature of the reaction vessel contents was raised to 50–55° C. and was maintained within that range for a period of about four hours. At the end of this period, an additional 0.014 g. of potassium persulfate were added and the 50–55° C. temperature was maintained for an additional two hours. During the latter period polymerization took place, as evidenced by the formation of a clear, tacky mass in the reaction vessel. The polymeric mass was washed with water and methanol and was then dried under vacuum to give approximately 2 g. (80% yield) of a clear, rubbery polymer. The polymer was found to be insoluble in benzene and xylene and soluble in trifluoroethyl trifluoroacetate.

Examples 2–13

The procedure described in Example 1 is repeated excepting that acrylate monomers, initiators and emulsifiers are varied, as indicated in the following table. In all cases substantially the same results are obtained; that is to say, good yields of a clear, rubbery polymer are obtained.

TABLE I

| Example | Acrylate Monomer(s) | Initiator | Emulsifier |
|---|---|---|---|
| 2 | 1,3-bis(1,1-dihydroperfluoropropoxy)isopropyl acrylate | Potassium persulfate | Sodium lauryl sulfate. |
| 3 | 1,3-bis(hexafluoroisopropoxy)isopropl acrylate | Benzoyl peroxide | Do. |
| 4 | 1,3-bis(hexafluoroisopropoxy)isopropyl methacrylate | Sodium peroxide | Sodium lauryl sulfosuccinate. |
| 5 | 1,3-bis(heptafluoroisopropoxy)isopropyl acrylate | Potassium persulfate | K salt of perfluorosulfonic acid. |
| 6 | 1,3-bis(perfluorohexoxy)isopropyl methacrylate | Azobutyronitrile | Trimethyltetradecylammonium chloride. |
| 7 | 1-(1,1-dihydroperfluoropentoxy)-3-(1,1-dihydroperfluoroheptoxy)isopropyl methacrylate | Sodium peroxide | Sodium lauryl sulfosuccinate. |
| 8 | 1,3-bis(1,1,2,2,3,3-hexahydroperfluoroheptoxy)isopropyl acrylate | Benzoyl peroxide | Sodium lauryl sulfate. |
| 9 | 1,3-bis(1,1,2,2-tetrahydro-3-trifluoromethylperfluoropentoxy)isopropyl acrylate | Potassium persulfate | K salt of perfluorosulfonic acid. |
| 10 | 1,3-bis(perfluorocyclobutoxy)isopropyl acrylate | Azobutyronitrile | Sodium lauryl sulfate. |
| 11 | 1,3-bis(perfluorocyclopentoxy)isopropyl acrylate | Potassium persulfate | Do. |
| 12 | 1,3-bis(1-hydroperfluorocyclohexoxy)isopropyl methacrylate | Benzoyl peroxide | Trimethyltetradecylammonium chloride. |
| 13 | A mixture of 50% by weight 1,3-bis(hexafluoroisopropoxy)isopropyl acrylate and 1,3-bis(hexafluoroisopropoxy)isopropyl methacrylate | Do | Sodium laurylsulfosuccinate. |

PREPARATION OF THE NOVEL POLYFLUOROALKOXY ACRYLATE MONOMERS

The novel polyfluoroalkoxy acrylate monomers, or mixtures thereof, are prepared by reacting the corresponding 1,3-bis(polyfluoroalkoxy)isopropanol of the formula:

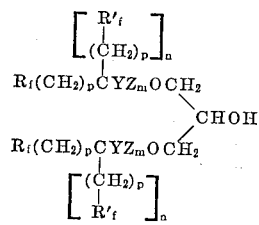

wherein Y, Z, $R_f$, $R'_f$, $m$, $n$ and $p$ are as defined supra, with an acrylic compound of the formula:

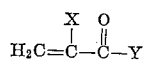

wherein X is H or $CH_3$ and Y is Cl, OH or $OCH_3$. The acrylic reactant may also be employed in the form of its anhydride which may be used in situ by reacting a mixture of glacial acrylic acid and perfluroacetic anhydride with the isopropanol reactant at below about room temperature.

The molar ratio of the reactants is not critical and from about 0.1 mole to about 10 moles isopropanol reactant per mole acrylic reactant may be employed to secure the desired reaction product. In order to secure highest yields, however, a substantially stoichiometric molar ratio should be employed, i.e., a mole ratio of about 1:1.

The reaction proceeds quite smoothly in the absence of a solvent. A suitable solvent, if desired however, may be employed to serve as a diluent and to facilitate the reaction at elevated temperatures. Generally speaking, any solvent may be employed provided it is inert under the conditions of the reaction and provided, of course, that it is a solvent for the reactants. Illustrative suitable solvents include: benzene, pyridine, quinoline, nitrobenzene, dimethyl aniline, Decalin and 1,1,2-trifluoro-1,2,2-trichloroethane.

In order to minimize reaction time, any of the well known esterification catalysts, such as pyridine, quinoline, p-toluene sulfonic acid, phosphoric acid, sulfuric acid and cupric chloride may be employed. The amount of catalyst is not critical and may range from about 1.0 to 200% by weight based on the amount of isopropanol reactant charged. When acrylyl or methacrylyl chloride is used, pyridine and quinoline are preferred catalysts since each, in sufficient amounts, acts as a solvent as well. Additionally, due to their low boiling points, pyridine and quinoline may be readily separated from the reaction product by simple distillation. If employed, the amount of pyridine or quinoline charged to the reaction mixture is generally about 0.10 to 2.00 parts, preferably 0.5 to 1.5 parts, per part isopropanol reactant charged.

The reaction temperature may vary over a wide range, i.e., from below room temperature up to the boiling point of the reaction mixture. Normally a temperature selected from about room temperature to 100° C. is utilized with a mild agitation of the reaction mixture. When the anhydride form of acrylic acid is employed, the reaction mixture is preferably maintained at about room temperature, say between about 10–30° C. and still preferably below about room temperature.

The esterification reaction is preferably run in the presence of a small mount of a conventional polymerization inhibitor, such as hydroquinone, α-pinene and p-tertiarybutyl catechol, in order to avoid undesirable premature polymerization which may take place to some extent, particularly at the more elevated temperatures.

Reaction times will depend upon the reactivity of the acrylic reactant chosen, the catalyst used, if any, and other variables, such as temperature. Substantial yields of product may be formed in a period from about 30 minutes to several hours.

Recovery and purification of the resulting acrylic monomer products may be effected by employing conventional procedures, such as solvent extraction, a series of water washing steps followed by drying, or ordinary distillation.

Example 14

To a three-necked 100 ml. flask, equipped with a thermometer, stirrer, dropping funnel and a water-cooled reflux condenser were added 13.0 g. (0.144 mole) of acrylyl chloride, 1 g. of $CuCl_2$ and 0.1 g. of hydroquinone. The temperature of the resulting mixture was raised to about 75° C., following which 27.0 g. (0.0689 mole) of 1,3-bis (hexafluoroisopropoxy)isopropanol (B.P. 56° C./5 mm.) were rapidly added, with stirring, through the dropping funnel. Temperature in the reaction flask was maintained between about 75–80° C. for a period of about six hours. At the end of this period the resulting mixture was fractionated through a small spinning band column to give 25 g. (0.056 mole, 81.0% yield) of 1,3-bis(hexafluoroisopropoxy)isopropyl acrylate (B.P. 93–94° C./5 mm.).

*Analysis.*—Calculated for $C_{12}H_{10}F_{12}O_4$: Percent H, 2.24; percent F, 51.12. Found: Percent H, 2.3; percent F, 49.7.

Infrared spectrographic analysis of this compound showed peaks consistent with the expected structure.

Examples 15–25

The procedure of Example 14 is repeated in identical apparatus, excepting that isopropanol reactants, acrylic reactants and acrylic end products are varied, as indicated in the following table.

TABLE II

| Example | Alcohol Reactant | Acrylic Reactant | Acrylate End Product |
|---|---|---|---|
| 15 | 1,3-bis(1,1-dihydroperfluoropropoxy)isopropanol | Acylic acid | 1,3-bis(1,1-dihydroperfluoropropoxy)isopropyl acrylate. |
| 16 | 1,3-bis(hexafluoroisopropoxy)isopropanol | Acrylyl chloride | 1,3-bis(hexafluoroisopropoxy)isopropyl acrylate. |
| 17 | do | Methacrylyl chloride | 1,3-bis(hexafluoroisopropoxy)isopropyl methacrylate. |
| 18 | 1,3-bis(heptafluoroisopropoxy)isopropanol | Acrylic acid | 1,3-bis(heptafluoroisopropoxy)isopropyl acrylate. |
| 19 | 1,3-bis(perfluorohexoxy)isopropanol | Methacrylic acid | 1,3-bis(perfluorohexoxy)isopropyl methacrylate. |
| 20 | 1-(1,1-dihydroperfluoropentoxy)-3-(1,1-dihydroperfluoroheptoxy)isopropanol. | do | 1-(1,1-dihydroperfluoropentoxy)-3-(1,1-dihydroperfluoroheptoxy)isopropyl methacrylate. |
| 21 | 1,3-bis(1,1,2,2,3,3-hexahydroperfluoroheptoxy)isopropanol. | Acrylyl chloride | 1,3-bis(1,1,2,2,3,3-hexahydroperfluoroheptoxy)isopropyl acrylate. |
| 22 | 1,3-bis(1,1,2,2-tetrahydro-3-trifluoromethylperfluoropentoxy)isopropanol. | Acrylic acid | 1,3-bis(1,1,2,2-tetrahydro-3-trifluoromethylperfluoropentoxy)isopropyl acrylate. |
| 23 | 1,3-bis(perfluorocyclobutoxy)isopropanol | Acrylylchloride | 1,3-bis(perfluorocyclobutoxy)isopropyl acrylate. |
| 24 | 1,3-bis(perfluorocyclopentoxy)isopropanol | do | 1,3-bis(perfluorocyclopentoxy)isopropyl acrylate. |
| 25 | 1,3-bis(1-hdyroperfluorocyclohexoxy)isopropanol | Methacrylic acid | 1,3-bis(1-hydroperfluorocyclohexoxy)isopropyl methacrylate. |

PREPARATION OF THE 1,3-BIS(POLYFLUOROALKOXY)ISOPROPANOL INTERMEDIATES

The 1,3-bis(polyfluoroalkoxy)isopropanol intermediates are novel compounds and, except for the perfluoroalkoxy and perfluorocycloalkoxy species, may be prepared in a one step operation by reaction of an alcohol of the formula:

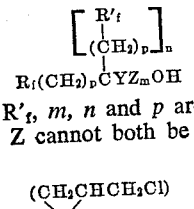

wherein Y, Z, $R_f$, $R'_f$, m, n and p are as defined supra, except that Y and Z cannot both be F, with epichlorohydrin

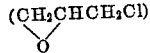

in an aqueous solution of a base, such as pyridine or sodium hydroxide.

In order to get maximum yields of the desired isopropanol intermediate by this one step operation, an excess of base relative to the epichlorohydrin should be employed, preferably between about 2.0–3.2 moles of base per mole of epichlorohydrin. Additionally, the concentration of alcohol starting material, relative to the epichlorohydrin reactant, should be in the range of about 1.5–4.0 moles of alcohol starting material per mole of epichlorohydrin, preferably between about 2.0–2.5 moles alcohol starting material per mole epichlorohydrin and still preferably between about 1.75–2.0 moles alcohol starting material per mole epichlorohydrin.

Any water soluble base may be employed in this process. Organic bases, such as pyridine, piperidine or triethyl amine may be employed; however, inorganic bases, such as sodium hydroxide, potassium hydroxide and the like are preferred.

The reaction may be conducted at superatmospheric as well as atmospheric pressure.

Reaction temperatures may vary over a wide range but should be somewhat elevated in order to promote a favorable reaction rate. When operating at atmospheric pressure, the upper temperature limitation is the reflux temperature of the mixture. In most cases, good results are obtained by operating at temperatures between about 50–120° C. and preferably between about 85–115° C. Product recovery can be effected by simple distillation.

Example 26

To a 100 ml. four-necked flask, equipped with a dropping funnel, thermometer, condenser and a magnetic stirrer, was charged a mixture of 50 g. (0.298 mole) of hexafluoroisopropanol and 25 g. of distilled water. 16.7 g. (0.298 mole) of potassium hydroxide pellets were added to the reaction flask contents at such a rate that the temperature did not exceed about 50° C. 12.8 g. (0.138 mole) of epichlorohydrin were then added slowly and the resulting mixture was heated to 89° C. and maintained at that temperature for a period of about one hour. On standing, an oil layer formed which was separated, washed with water, dried over anhydrous sodium sulfate and vacuum distilled from which were recovered 20.0 g. (0.051 mole) of 1,3-bis(hexafluoroisopropoxy)isopropanol (B.P. 56.5–57° C./5 mm.).

*Analysis.*—Calculated for $C_9H_5F_{12}O_3$: C, 27.6%; H, 2.04%; F, 58.2%. Found: C, 27.7%; H, 2.1%; F, 58.0%.

Infrared spectrographic analysis confirmed identity of the expected structure.

Examples 27–32

The procedure described in Example 26 is repeated in the same apparatus excepting that alcohol reactants, base and end products are varied, as indicated in the following table. Molar ratios of reactants employed are within the preferred ranges indicated supra.

TABLE III

| Example | Alcohol Reactant | Base | End Product |
|---|---|---|---|
| 27 | 1,1-dihydroperfluoropropanol | Sodium hydroxide | 1,3-bis(1,1-dihydroperfluoropropoxy)isopropanol. |
| 28 | Hexafluoroisopropanol | Potassium hydroxide | 1,3-bis(hexafluoroisopropoxy)isopropanol. |
| 29 | 1,1-dihydroperfluoropentanol and 1,1-dihydroperfluoroheptanol. | do | 1-(1,1-dihydroperfluoropentoxy)-3-(1,1-dihydroperfluoroheptoxy)isopropanol. |
| 30 | 1,1,2,2,3,3-hexahydroperfluoroheptanol | Sodium hydroxide | 1,3-bis(1,1,2,2,3,3-hexahydroperfluoroheptoxy)isopropanol. |
| 31 | 1,1,2,2-tetrahydro-3-trifluoromethylperfluoropentanol | Pyridine | 1,3-bis(1,1,2,2-tetrahydro-3-trifluoromethylperfluoropentoxy)isopropanol. |
| 32 | 1-hydroperfluorocyclohexanol | Potassium hydooxide | 1,3-bis(1-hydroperfluorocyclohexoxy)isopropanol. |

Unsymmetrical(polyfluoroalkoxy)isopropanols may be prepared by the following procedure. A polyfluorinated alcohol, as above described, is reacted with epichlorohydrin in the presence of base in such a manner as to obtain, as a major product, a glycidyl ether intermediate having the formula:

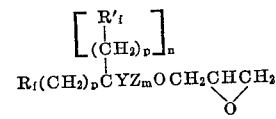

wherein Y, Z, $R_f$, $R'_f$, m, n and p are as indicated supra. This can be accomplished by the procedure above described for reacting these materials, except that the concentration of reactants is regulated so that the molar ratio of base to epichlorohydrin lies in the range of 1.0–2.5:1, preferably 2.0–2.2:1, and so that the molar ratio of polyfluorinated alcohol to epichlorohydrin lies in the range of 0.5–1.5:1, preferably 0.9–1.2:1. The glycidyl ether intermediate can then be isolated and reacted with a dissimilar polyfluorinated alcohol, as above described, to give an unsymmetrical(polyfluoroalkoxy)isopropanol product.

The 1,3-bis(perfluoroalkoxy)isopropanol intermediates cannot be prepared from the corresponding perfluoroalkanols or perfluorocycloalkanols due to the unavailability or instability of the latter alcohols. They may be prepared, however, by the reaction of epibromohydrin, with the KF adduct of a suitable perfluorinated ketone or with the KF adduct of a suitable perfluorinated alkanoyl fluoride.

These reactions must be conducted under anhydrous conditions in the presence of an inert polar solvent, such as acetonitrile, nitrobenzene, diglyme, etc.

The solvent should be employed in a large excess, say in a 5:1 volume ratio to the amount of KF employed.

At least a stoichiometric amount of KF should be employed and preferably a 10% stoichiometrical excess, based upon the quantity of ketone or acid fluoride charged.

Reaction temperatures in the range of about 80–120° C. are satisfactory, with temperatures around 100° C. being preferred.

These reactions are most efficiently carried out in closed reatcors under autogenous pressures.

Product recovery involves conventional, filtering, washing, drying and distilling steps.

The following illustrate practice of such procedures.

Example 33

The apparatus consists of a 225 ml. Fisher Porter aerosol compatibility tube (pressure reaction vessel), equipped with a magnetic stirrer, a pressure gauge, an S. S. Hoke valve and an oil bath for controlling reaction temperature. The reaction vessel is charged with 18 g. (0.31 mole) of anhydrous KF, 100 ml. of anhydrous acetonitrile and 18 g. (0.13 mole) of epibromohydrin. 50 g. (0.30 mole) of hexafluoroacetone are then added to the reatcion mixture, with stirring, by vacuum transfer. The reaction mixture is heated for about 24 hours at 100° C., with continued stirring following which the reaction vessel is cooled and vented. The liquid product is filtered, washed with water, dried and distilled. The main product consists of 1,3-bis(heptafluoroisopropoxy)isopropanol.

Example 34

Into apparatus as described in Example 33, are charged 10 g. (0.19 mole) of anhydrous KF, 100 ml. of acetonitrile and 14 g. (0.10 mole) of epibromohydrin. 83 g. (0.20 mole) of perfluorooctanoyl fluoride are added to the reaction mixture with stirring. The resulting mixture is heated for 24 hours, with continued stirring, at 105° C. At the end of this period, the reaction vessel is cooled and the liquid product is filtered, washed with water, dried and distilled. The main product consists of 1,3-bis(perfluorooctoxy)isopropanol.

With the exceptions of 1-hydroperfluorocycloalkanols and those alcohols wherein both Y and Z are F, the various species of starting alcohols embraced by the formula:

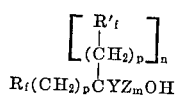

$$R_f(CH_2)_pCYZ_mOH$$

wherein Y, Z, $R_f$, $R'_f$, m, n and p are as indicated supra, belong to known classes of compounds. Many are available commercially and all may be prepared by well known and conventional reactions from available or known precursors, such as the corresponding polyhalogenated ketones. 1-hydroperfluorocycloalkanols are the subject of co-pending, commonly assigned application of Louis G. Anello and Richard F. Sweeney, Ser. No. 424,827, filed Jan. 11, 1965, now Patent No. 3,350,464, and may be prepared by reduction of the corresponding perfluorinated cycloalkanone with sodium borohydride in the presence of an inert polar solvent at temperatures in the range of about 20–70° C. Those alcohols wherein both Y and Z are F, are, as noted above, either not known to exist or are not known to be sufficiently stable to permit reaction according to the processes described herein. The corresponding perfluorinated alkanones and cycloalkanones, as well as the corresponding perfluorinated alkanoyl fluorides, which serve as starting materials for the perfluoroalkoxy and perfluorocycloalkoxy species of isopropanol intermediates, are also known classes of compounds which are either commercially available or may be prepared by standard techniques.

UTILITY OF THE POLYMERIC PRODUCTS

The homopolymeric products may be used to impart oil and water repellent properties to a variety of porous materials, such as textiles, fibers, fabrics of natural or synthetic origin, e.g., cotton cloth, nylon and a variety of other substrates, such as paper, wood, metal and the like. The polymer is applied as a coating to such materials by conventional techniques, such as spraying, brushing or dipping procedures. The polymers may be used as an aqueous emulsion or in solution with a suitable solvent, followed by drying of the coated material to remove water or the solvent.

In the following example, the so-called "3M Oil Repellency Test" was used to evaluate the oil repellent properties of a cotton fabric treated with representative homopolymeric products. This test was performed as described by E. J. Grajeck et al., Textile Research Journal, April 1962, pp. 323–324. Water repellency was evaluated by the "Spray Test Method" (ASTM-D583–58).

Example 35

Samples of 80" x 80" undyed cotton print cloth were dipped into a solution comprising 4% by weight of the 1,3 - bis(hexafluoroisopropoxy)isopropyl acrylate polymer prepared in Example 16, in a solvent comprising trifluoroethyl trifluoroacetate. The cloth samples were blotted with paper toweling to remove excess solution and were then dried in an oven at 160° C. for five minutes. The oil repellency, as measured by the "3M Oil Repellency Test," received a rating of 80. The water repellency, as measured by the "Spray Test Method," received a rating of 60.

When other homopolymers within the scope of the invention are used to form coatings on porous materials, such as described above, substantially the same results are obtained, i.e., there is imparted to such materials good oil and water repellency properties. Even more significantly, coatings so formed and applied exhibit a high degree of durability and retain their oleophobic and hydrophobic properties even after repeated washings, dry cleaning and long wear. Oil repellency ratings for these materials vary from about 80 up to about 130 with water repellency ratings varying from about 60 to about 70.

The homopolymeric products may also be used to cast elastic, transparent, thermoplastic films by conventional procedures, such as by casting a solution of the polymeric product in a suitable solvent over a smooth surface, evaporating the solvent therefrom, drying the resulting film and stripping the same from the smooth surface. Such films may also be prepared by casting solutions of the corresponding monomers over the smooth surface in a suitable solvent, evaporating the solvent, drying the resulting film and polymerizing in situ by means of heat and small amounts of a conventional initiator.

The foregoing description is to be taken as illustrative only and the invention is to be limited only by the scope of the appended claims.

We claim:

1. Polyfluoroalkoxy acrylates of the formula:

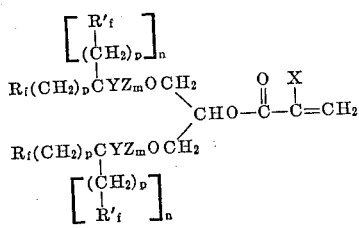

wherein X is H or CH$_3$; Y is H or F; Z is H or F; R$_f$ and R′$_f$ which may be the same or different, when taken singly, are straight chain perfluorinated alkyl groups each having from 2 to 11 carbon atoms and, when taken together, form a polyfluorinated cycloalkyl group possessing 4–6 carbon atoms inclusive; $n$ to 0 or 1; $m$ is 0 or 1; provided that when $n$ is 1, $m$ is 0 and when $n$ is 0, $m$ is 1 and provided that when $m$ is 1, Y and Z are alike; and wherein $p$ is 0–8.

2. Polyfluoroalkoxy acrylates according to claim 1 wherein X is H.

3. Polyfluoroalkoxy acrylates according to claim 1 wherein $n$ is 1.

4. Polyfluoroalkoxy acrylates according to claim 1 wherein $p$ is 0–2.

5. Polyfluoralkoxy acrylates according to claim 1 wherein X is H, $n$ is 1, $p$ is 0–2.

6. Polyfluoroalkoxy acrylates according to claim 5 wherein the R$_f$ and R′$_f$ groups each have from 6–10 carbon atoms.

7. 1,3-bis(hexafluoroisopropoxy)isopropyl acrylate.
8. 1,3-bis(heptafluoroisopropoxy)isopropyl acrylate.
9. 1,3-bis(perfluorohexoxy)isopropyl methacrylate.
10. 1,3-bis(perfluorocyclobutoxy)isopropyl acrylate.

11. Polymers comprising recurring polyfluoroalkoxy acrylate ester units of the formula:

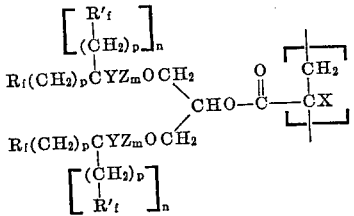

wherein X is H or CH$_3$; Y is H or F; Z is H or F; R$_f$ and R′$_f$ which may be the same or different, when taken singly, are straight chain perfluorinated alkyl groups each having from 2 to 11 carbon atoms and, when taken together, form a polyfluorinated cycloalkyl group possessing 4–6 carbon atoms inclusive; $n$ is 0 or 1; $m$ is 0 or 1; provided that when $n$ is 1, $m$ is 0 and when $n$ is 0, $m$ is 1 and provided that when $m$ is 1, Y and Z are alike; and wherein $p$ is 0–8.

12. Polymers according to claim 11 wherein X is H.

13. Polymers comprising recurring polyfluoroisopropoxy acrylate ester units of the formula:

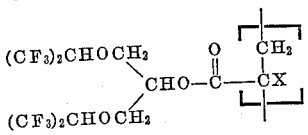

wherein X is H or CH$_3$.

14. A polyfluoroalkoxy acrylate homopolymer derived from a monomer having the formula:

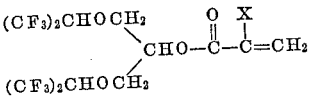

wherein X is H or CH$_3$.

15. 1,3 - bis(polyfluoroalkoxy)isopropanols of the formula:

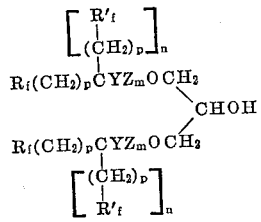

wherein Y is H or F; Z is H or F; R$_f$ and R′$_f$ which may be the same or different, when taken singly, are straight chain perfluorinated alkyl groups each having from 2 to 11 carbon atoms and, when taken together, form a polyfluorinated cycloalky group possessing 4–6 carbon atoms inclusive; $n$ is 0 or 1; $m$ is 0 or 1, provided that when $n$ is 1, $m$ is 0 and when $n$ is 0, $m$ is 1 and provided that when $m$ is 1, Y and Z are alike; and wherein $p$ is 0–8.

16. 1,3-bis(polyfluoroalkoxy)isopropanols according to claim 15 in which $n$ is 1 and $p$ is 0–2.

17. 1,3-bis(hexafluoroisopropoxy)isopropanol.

No references cited.

JOSEPH L. SCHOFER, *Primary Examiner.*

HARRY WONG, JR., *Assistant Examiner.*